United States Patent
Gregg et al.

(10) Patent No.: US 7,685,352 B2
(45) Date of Patent: Mar. 23, 2010

(54) SYSTEM AND METHOD FOR LOOSE ORDERING WRITE COMPLETION FOR PCI EXPRESS

(75) Inventors: Thomas A. Gregg, Highland, NY (US); David Craddock, New Paltz, NY (US); Gregory Francis Pfister, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 30 days.

(21) Appl. No.: 12/184,146

(22) Filed: Jul. 31, 2008

(65) Prior Publication Data

US 2010/0031272 A1     Feb. 4, 2010

(51) Int. Cl.
*G06F 13/36* (2006.01)
(52) U.S. Cl. .......................................... 710/310; 710/52
(58) Field of Classification Search ............... 710/52, 710/55, 56, 57, 310
See application file for complete search history.

(56) References Cited

U.S. PATENT DOCUMENTS

| | | | |
|---|---|---|---|
| 6,078,968 A | 6/2000 | Lo | |
| 6,209,067 B1 | 3/2001 | Collins | |
| 7,200,641 B1 | 4/2007 | Throop | |
| 7,380,018 B2* | 5/2008 | Moll | 709/239 |
| 7,412,555 B2* | 8/2008 | Wang | 710/310 |
| 7,484,033 B2* | 1/2009 | Ishizawa et al. | 710/316 |
| 2005/0235067 A1* | 10/2005 | Creta et al. | 710/5 |
| 2005/0289306 A1* | 12/2005 | Muthrasanallur et al. | 711/158 |
| 2006/0173970 A1* | 8/2006 | Pope et al. | 709/216 |
| 2007/0130372 A1 | 6/2007 | Irish | |
| 2007/0208820 A1 | 9/2007 | Makhervaks | |
| 2008/0114909 A1* | 5/2008 | Wong | 710/39 |
| 2008/0141276 A1 | 6/2008 | Borgendale | |
| 2009/0248942 A1* | 10/2009 | Kloeppner | 710/310 |

OTHER PUBLICATIONS

The Effective Buffer Architecture For Data Link Layer of PCI Express, Hyun et al., IEEE, 2004.*

* cited by examiner

*Primary Examiner*—Khanh Dang
(74) *Attorney, Agent, or Firm*—Shimokaji & Associates, P.C.

(57) ABSTRACT

A method for managing the protocol of read/write messages in a PCI Express communication link is disclosed. The method comprises maintaining queues of write requests and read requests associated with each of a plurality of request identifications that are contained in a message header, wherein the read requests associated with a request identification are held in abeyance until such time that write requests associated with the request identification are completed.

1 Claim, 4 Drawing Sheets

SYSTEM AND METHOD FOR LOOSE ORDERING WRITE COMPLETION FOR PCI EXPRESS

BACKGROUND OF THE INVENTION

The present invention is related to the field of computer communications and more particularly to improved PCI Express (PCIe) communications.

PCI (Peripheral Component Interconnect) and PCI Express (Peripheral Component Interconnect Express) are two well-known protocols used for providing a communication between personal computer systems. With multiple devices providing simultaneous data streams, a high degree of parallel processing and/or multithreaded processing is required. Under the current PCIe protocol, a mechanism of sorting to DRAM (Dynamic Random Access Memory) pages has been proposed that allows for re-ordering of some, but not all, operations to support high bandwidth adapters, including accelerators. Under this proposed mechanism of sorting DRAM, a doubling (or more) in the performance may be achieved on non-sequential memory access.

However, because PCIe posted writes do not provide a completion signal, a device or functional sub-part of a device has no means of knowing when a collections of writes has been completed. Hence, the standard mechanism for ensuring that writes are completed in the PCIe (zero-length Read) reduces the benefit of loose ordering by ordering all streams, potentially eliminating all benefit that was gained in performance.

One proposed solution of having a posted write with a completion response has been considered in the PCI SIG (Special Interest Group). However, this proposed solution has been rejected on the grounds that it can lead to deadlock or livelock under some circumstances.

Hence, there is a need for a method and apparatus for providing a loose-ordering of multiple streams in PCIe communications.

SUMMARY OF THE INVENTION

A method for managing the protocol of read/write messages in a PCI Express communication link is disclosed. The method comprises the steps of receiving at least one message associated with each of plurality of data streams, extracting a request identification (RID) from each of the at least one messages in each of the plurality of data streams, associating each message with a corresponding request identification, determining a type of message for each of the at least one received messages associated with a corresponding request identification, the message type selected as at least one of a write message type and a read message types outputting the at least one message associated with a write message type associated with the determined request identification, providing an indication that at least one of the write message type associated with the corresponding request identification is in progress, determining whether the indication associated with a prior one of the at least one message indicates outputting of the writing messages type corresponding to the request identification is in progress, storing the at least one read message type associated with the determined request identification during a period the indication indicates the outputting is in progress, receiving a indication of completion of outputting the at least one write message associated with the determined request identification, determining whether a message associated with the read message type corresponding to the determined request identification is stored and outputting the read message type.

These and other features, aspects and advantages of this invention of the present invention will become better understood with reference to the following drawings, description, and claims.

DETAILED DESCRIPTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Figure 1:
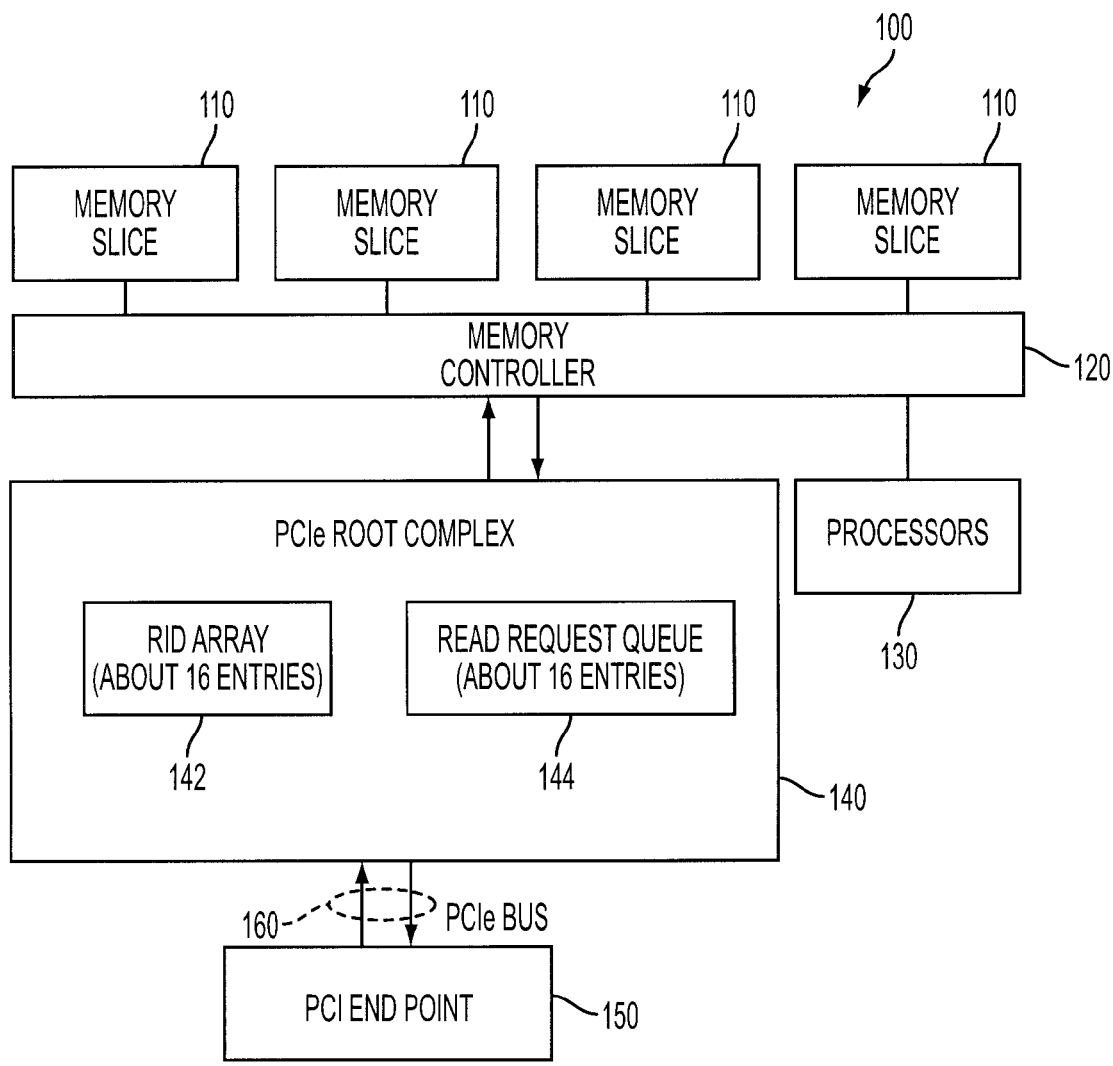
FIG. 1 illustrates a system for processing multiple streams in a PCIe communication protocol in accordance with the principles of the invention.

FIG. 1 illustrates an exemplary system 100 for processing multiple data streams in accordance with the principles of the invention. The system may be composed of a plurality of memory slices 110. Each memory slice 110 operates independently and represents a portion of a memory space that may be interleaved on a cache line basis. Each memory slice 110 may represent 64, 128, 256 bytes or the like. This may be determined dependent upon the number of streams to be handled and the size of the overall memory. Memory controller 120 may receive multiple memory requests to read or write data to a memory slice. In the case of write requests, the writes may be seen out-of-order to the processors with regard to which memory slice 110 the write is destined. The memory controller may identify to which memory slice 110 a write is destined by the address in the PCIe packet header. The Request Identification (RID) in a write header message is stored in the RID array 142 and a valid bit may be set for the RID array entry indicating that a write request to a memory slice for the valid RID is pending. Request Identifications are known in the art and need not be discussed in detail herein. Accordingly, each Request Identification is associated with an outstanding memory write request to the memory slices 110.

PCIe Root Complex 140 may monitor outstanding write and read requests received from PCI endpoint 150 via communication bus 160. As write requests are made to the memory controller 120, PCIe Root Complex 140 may store the request identification information contained in the header of the write request in RID array 142 and may set a valid bit for the entry. In this illustrated example, the RID array 142 is designed for 16 outstanding write requests to the memory controller. However, it would be recognized that the number 16 is shown only for illustrative purposes and that the array 142 may be expanded or reduced to include more elements. The write requests are then output to the appropriate memory slice.

As write completions are received from memory controller 120 with regard to one or more of the write requests associated with one or more request identifications, the PCIe Root Complex 140 may remove the indication that the write requests associated with the write completion from the RID array 142 by resetting the valid bit for the entry.

PCIe Root Complex 140 further includes a read request queue that stores read requests received over the bus 160 only if the RID in the read request matches one or more of the valid RIDs in the RID array 142. The read requests may be queued while the write requests are being processed (i.e., in-progress). In this manner, the read requests may be held until all write request completion indications are received by the PCIe root complex 140 from the memory slice for the corresponding RID. As noted previously, when write completions are received, the PCIe root complex 140 may remove the indication (i.e., the RID value) from the RID array 142 by resetting the valid bit and, thus, after all write requests are completed, a read request associated with the same RID may then be processed. When there are multiple valid RID array entries with the same RID value, any one of the entries may be removed by resetting its valid bit.

Figure 2A:
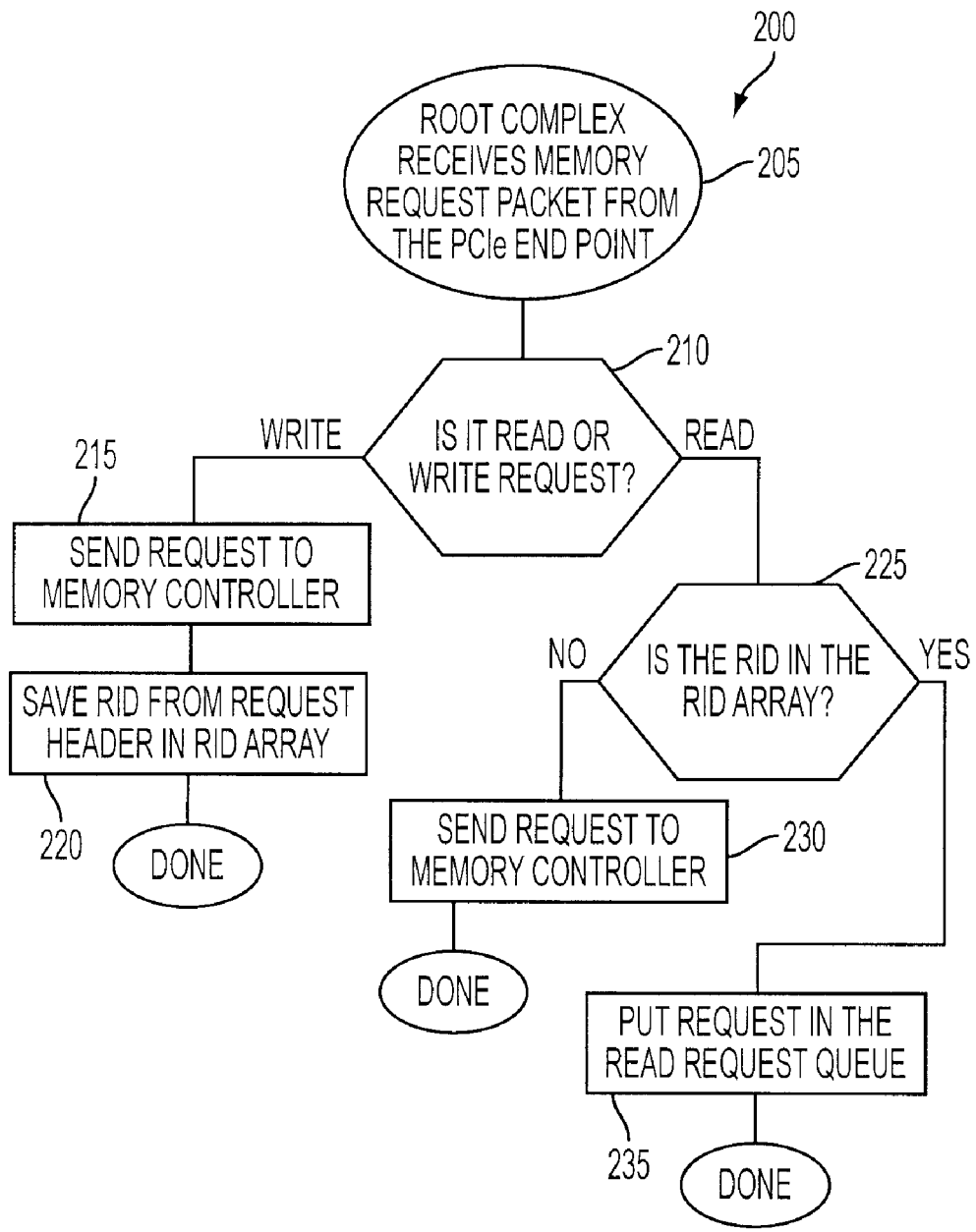
FIGS. 2A and 2B illustrates flowcharts of multiple stream processing for the PCIe communication system shown in FIG. 1.

FIG. 2A illustrates a flow chart of an exemplary process 200 for monitoring requests in the PCIe root complex 140 in accordance with the principles of the invention. In this exemplary process PCIe root complex 140 receives a memory access request (write or read) from PCIe endpoint 160 at block 205. At block 210 a determination may be made whether the request is a read or a write request. If the request is a write request, then processing proceeds to block 215 wherein the write request may be provided to the memory controller 120. The memory controller 120 may then extract the RID information from the header and provide the write request to the appropriate memory slice 110 as determined by the PCIe header address. At block 220, the RID information associated with the request may be extracted from the request header information and stored in the RID array 142 along with a corresponding valid bit for the RID array entry may be set.

However, if the request is a read request, then processing proceeds to block 225 where a determination may be made whether write requests with the same RID are in-progress. This determination may be performed by checking RID array 142 entries with the valid bit set. In one aspect of the invention, the determination may be made by determining whether the RID in the header of the read request is stored in the RID array 142. If the RID of the read request is stored in any valid entry of the RID array 142, then the read request may be held while writes are in-progress by storing the request (including its RID) on the read request queue 144. Again, a valid bit may be used to indicate the validity of the read request queue entry.

However, if the RID of the read request is not stored in the RID array 142 (i.e., write requests not in-progress), then the read request may be provided to the memory controller 120 for subsequent processing at block 230.

Figure 2B:
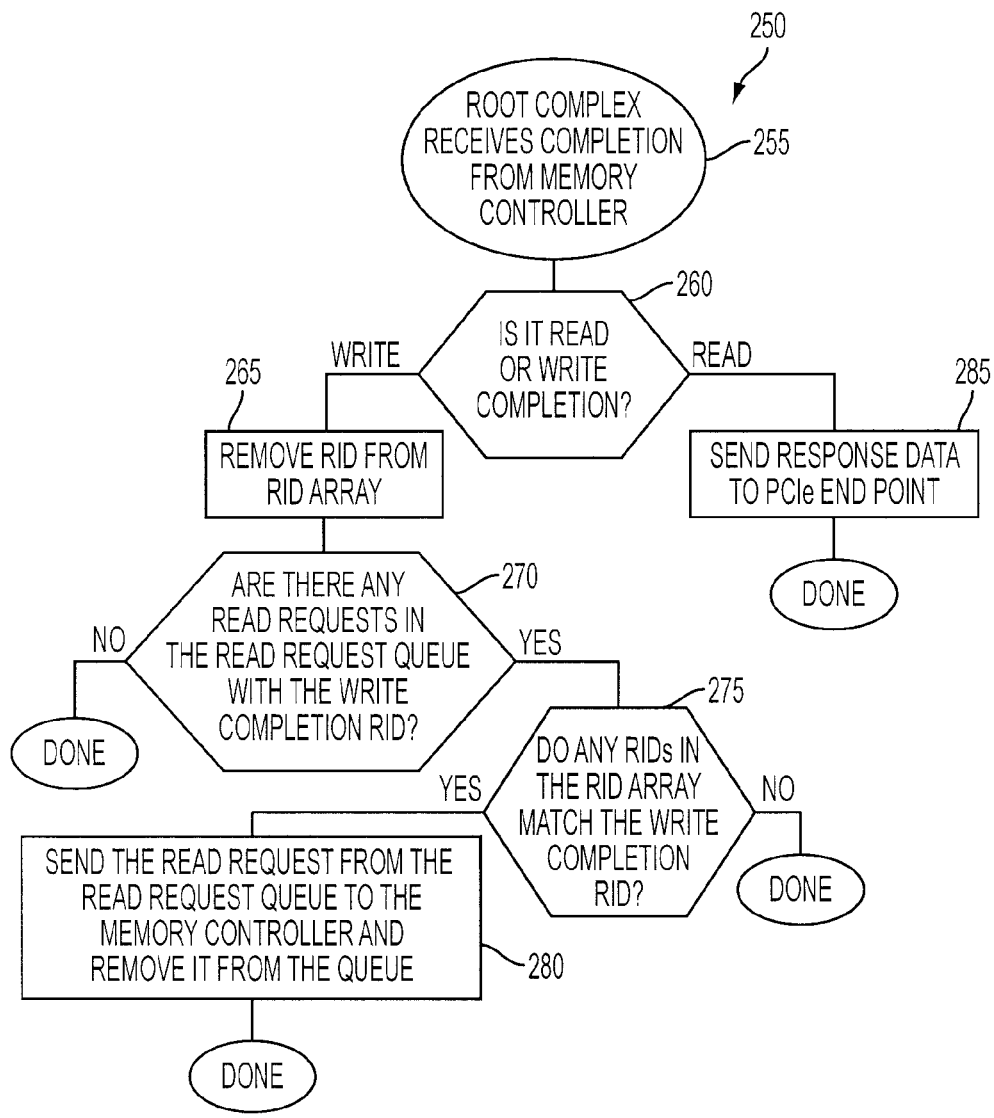

FIG. 2B illustrates a flow chart of an exemplary process 250 for managing responses from the memory controller 120 in accordance with the principles of the invention. In this illustrated process, the PCIe Root Complex 140 may receive a completion indication from the memory controller 120 at block 225. At block 260, a determination is made whether the completion indication is associated with a read request or a write request. If the completion indication is associated with a previously submitted read request, then a response is provided to the PCIe endpoint 150 to indicate that data read is available.

However, if at block 260, the completion indication is associated with a write request, then the RID associated with the completion indication is determined from the header information at block 265 and may be removed from the RID array 142 by resetting the valid bit to indicate the associated write request(s) has completed. At block 270, a determination is made whether there are any read requests on the read request queue. If the answer is negative, then processing is completed.

Otherwise, a determination may be made at block 275 whether any more valid RIDs in the RID read request queue match the RID determined from the completion indication. If the answer is negative, then processing is completed. When each write request is sent to the memory controller, the RID is saved in the RID array and the valid bit for the entry is set. As multiple write requests with the same RID can be sent to the memory controller before the first completion is received back from the memory controller, there may be more than one entry with the same RID. When the write completion is received, a single entry in the RID array with the same RID as the write response RID is removed. However, there may be additional RIDs in the RID array with the same RID value. In either case, only after all RIDs with the same value as the read request have been completed (invalidated) can the read request be processed.

As discussed previously, use of the RID value in the RID array 142 and the read request queue is advantageous but is not the only method of correlating between active writes and read requests.

Otherwise, a read request that was stored in the read request queue corresponding to the RID of the received completion indication is transmitted to the memory controller 120. The RID request is then removed from the read request queue at block 280.

Figure 3:
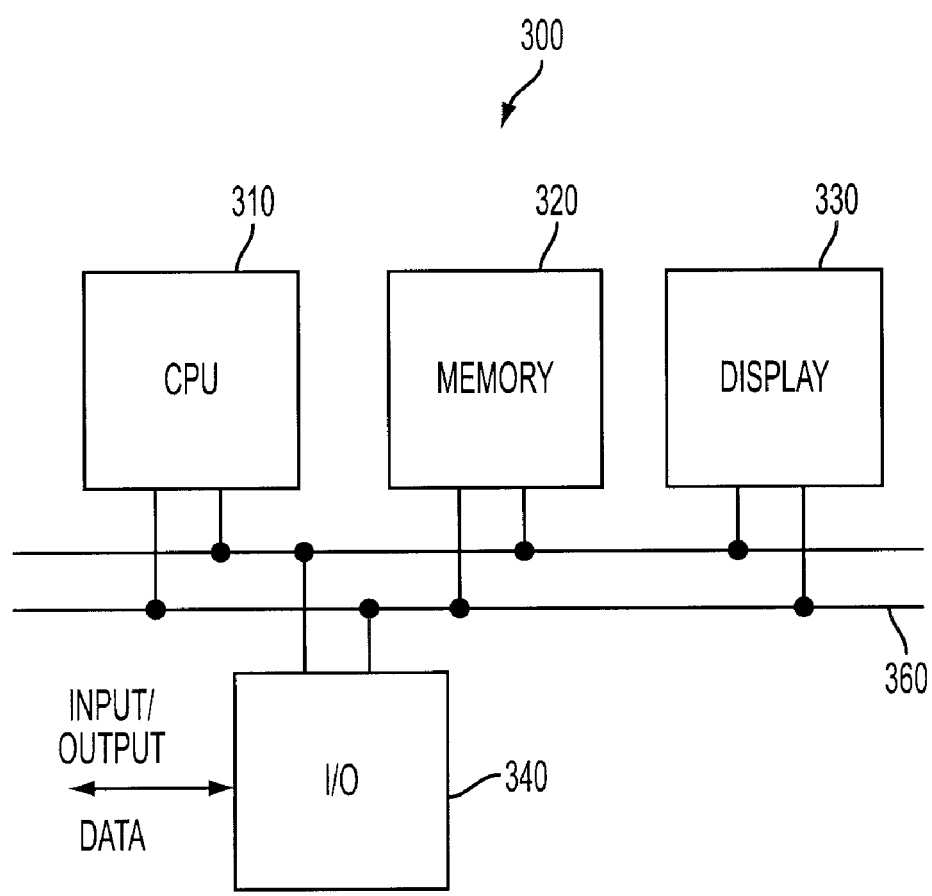
FIG. 3 illustrates in further detail the system shown in FIG. 1.

FIG. 3 illustrates an exemplary system 300 for implementing the processing shown in FIGS. 2A and 2B, in accordance with the principles of the invention as shown in FIG. 1. In this exemplary system embodiment, a processor (CPU) 310, memory 320, display 330, and I/O device 340 may each be in communication via a communication bus 360. Processor 310 may be any type of processor that receives known inputs and performs one or more processing steps under the direction of programming instructions. Processor 310 may be CISC (complete instruction set computer) or RISC (reduced instruction set computer) type processor. Memory 320 may be, for example, a solid-state semiconductor memory represented as RAM, ROM, EPROM, Flash, etc., that may store instructions that provide instruction to processor 310. The instructions, i.e., code, may be stored in permanent memory, e.g., PROM, and variable or changeable data may be store in RAM.

Display 330 may be used to present the read and or write requests to a user.

I/O device 340 may provide a means for inputting and outputting information to and from processor 310. For example, I/O device 340 may receive information from one or more program blocks. This information may be provided to processor 310 to process each block, in turn. The results may then be displayed upon each block on display 330. Although not shown it would be appreciated that the data may be provided from or to a network, such as a WAN, LAN, POTS and the Internet.

It would be recognized by those skilled in the art, that the invention described herein can take the form of an entirely hardware embodiment, an entirely software embodiment, or an embodiment containing both hardware and software elements. In an exemplary embodiment, the invention may be implemented in software, which includes but is not limited to firmware, resident software, microcode, etc.

In this case, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

It is to be understood that the specific embodiments of the invention that have been described are merely illustrative of certain applications of the principle of the present invention. Numerous modifications may be made to a system and method for automatically relating components of a storage area network in a volume container described herein without departing from the spirit and scope of the present invention.

What is claimed is:

1. A method for managing the protocol of read/write messages in a PCI Express communication link comprising:

receiving at least one message associated with each of plurality of data streams;

extracting a request identification (RID) from each of said at least one messages in each of said plurality of data streams;

associating each message with a corresponding request identification, determining a type of message for each of the at least one received messages associated with a corresponding request identification, said message type selected as at least one of a write message type and a read message type;

outputting said at least one message associated with a write message type associated with a corresponding request identification;

providing an indication that outputting of at least one of said write message type associated with said corresponding request identification is in progress;

determining whether said indication associated with a prior one of said at least one messages indicates outputting of said write message type corresponding to said request identification is in progress;

storing said at least one read message type associated with said corresponding request identification during a period said indication indicates said outputting is in progress;

receiving an indication of completion of outputting of said at least one write message associated with said corresponding request identification;

determining whether additional messages of said write message type are associated with said corresponding request identification and outputting said additional messages of said write message type;

determining whether a message associated with said read message type corresponding to said corresponding request identification is stored after all messages of said write message type associated with said corresponding request identification have been output; and outputting said read message type.

* * * * *